(12) United States Patent
Sumitani

(10) Patent No.: US 6,213,543 B1
(45) Date of Patent: Apr. 10, 2001

(54) DELECTOR FOR AUTOMOBILE SUNROOF

(75) Inventor: Keiji Sumitani, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/460,799

(22) Filed: Dec. 15, 1999

(30) Foreign Application Priority Data

Dec. 15, 1998 (JP) .................................................. 10-356262
May 19, 1999 (JP) .................................................. 11-138097

(51) Int. Cl.⁷ ........................................................... B60J 7/22
(52) U.S. Cl. ................................................................ 296/217
(58) Field of Search ............................................... 296/217

(56) References Cited

U.S. PATENT DOCUMENTS 5,836,643 * 11/1998 Preiss ..................................... 296/217

FOREIGN PATENT DOCUMENTS

| 90433 | * | 4/1988 | (JP) | ...................................... 296/217 |
| 7-285343 | | 10/1995 | (JP) . | |
| 6603193 | * | 9/1967 | (NL) | ..................................... 296/217 |
| 7510515 | * | 9/1975 | (NL) | ..................................... 296/217 |

* cited by examiner

Primary Examiner—Dennis H. Pedder
(74) Attorney, Agent, or Firm—Pillsbury Winthrop LLP

(57) ABSTRACT

The present invention relates to a deflector protruding upward from an edge portion located before an opening of a sunroof provided in a roof of an automobile. The deflector is provided with a guide face which is altogether smoothly curved upward in a convex shape and which has a maximum height at a center thereof in a fore-aft direction of the automobile.

14 Claims, 11 Drawing Sheets

FRONT

FRONT

DELECTOR FOR AUTOMOBILE SUNROOF

BACKGROUND OF THE INVENTION

1. Field of the invention

The present invention relates to a deflector of an automobile sunroof which protrudes upward from front the edge portion of a sunroof opening provided in an automobile roof and changes the airflow direction.

2. Description of the Related Art

When an automobile is running at a high speed in a state where the opening of the roof is opened by removing a sunroof panel or a sunroof glass of the sunroof, unpleasant noise referred to as wind throb is generated by hitting of the airflow against the edge portion of the roof located at the back of the opening. The deflector is used to avoid such situation.

Referring to the sectional view in FIG. 21, a conventional deflector 20 is formed such that it protrudes upward from an opening 21 when a sunroof panel or a sunroof glass is removed from the opening 21. The deflector 20 has a guide face 22 which deflects the airflow 24 upward. The airflow 24 which has flown from the front along the roof 23 is prevented from hitting against the edge portion of the roof located at the back of the opening 21 by enlarging the angle of inclination a formed by the guide face 22 and a roof 23 or enlarging the protrusion amount h of the guide face 22 from the roof 23 (refer to Japanese Patent Application Laid-Open HEI 7-285343).

When the airflow is deflected upward by the deflector, the direction of flow is changed by the deflector. It is known that the speed of the slip stream separated by the deflector, or the vortex flow is increased as the curvature for changing the flow direction is made larger. On the other hand, the wind noise generated by the deflector becomes larger in proportion to the sextuplicate of flow velocity. Accordingly, referring to FIG. 22 showing the characteristics of sound pressure level against deflector protrusion amount, the wind throb A at vehicle speed of 55 km/h is decreased as the deflector protrusion amount increases, while the wind noise B at vehicle speed of 100 km/h is increased as the deflector protrusion amount increases. As apparent from FIG. 22, wind throb A and wind noise B are contradictory items.

Conventionally, the airflow from the front is changed upward by the deflector to prevent the airflow from hitting against the edge portion of the roof located at the back of the opening. However, after repeating the experiment while varying the position and shape of the deflector, an equivalent effect was proved to be achieved by restricting the airflow behind the deflector from going downward.

SUMMARY OF THE INVENTION

The present invention provides a deflector of an automobile sunroof which is capable of restricting the generation of wind throb and reducing the wind noise.

The present invention is a deflector which protrudes upward from the edge portion of the roof located before the sunroof opening provided in an automobile roof.

According to a first aspect of the present invention, the deflector is altogether smoothly curved upward in a convex shape, and is provided with a guide face having a maximum height at almost a center thereof in the vehicle fore-aft direction.

According to a second aspect of the present invention, the deflector is provided with a portion which is distanced from the edge portion of the roof located before the roof opening in order to create airflow toward the opening via under the deflector while the vehicle is running forward.

According to a third aspect of the present invention, the deflector as a whole is altogether smoothly curved upward in a convex shape, and is provided with a guide face having a maximum height at almost a center thereof in the vehicle fore-aft direction. Further, the deflector is provided with a portion which is distanced from the roof edge located before the roof opening in order to create airflow from toward the opening via under the deflector while the vehicle is running forward.

The automobile may be provided with a sunroof panel or a sunroof glass for opening and closing the opening. The deflector may be made such that it protrudes from the opening when the opening is opened.

The deflector may be made installable to the edge portion located before the opening or to the roof portion located before this edge.

By removing the sunroof panel or the sunroof glass when the automobile is moving forward, the airflow along the roof hits the deflector, and thus the direction of flow is changed.

With the invention wherein the deflector is provided with a guide face curved upward in a convex shape, the airflow is directed upward and thus the airflow is prevented from reaching the edge portion of the roof located at the back of the opening. Because the guide face of the deflector as a whole is smoothly curved upward in a convex shape, the curvature for changing the direction of flow is small, and therefore generation of a slip stream can be restricted.

Because the airflow, the flow direction of which has been changed by the deflector, is prevented from reaching the edge portion of the roof located at the back of the opening, the generation of wind throb can be restricted. Further, because the curvature for changing the direction of the flow by the deflector is small, little slip stream is generated when the airflow hits the deflector, and the degree of a speed increase in the generated slip stream is small. Accordingly, the generation of wind noise can be restricted, and when the wind noise is generated, it can be restricted to a low level.

With the invention wherein the airflow is led under the deflector, air not only flows backwards via the portion above the deflector but also flows backward via the portion under the deflector. The airflow which has reached the opening via the portion under the deflector can maintain a pressure relationship between the backward airflow via the portion above the deflector such that the former supports the latter from underneath. Accordingly, it becomes difficult for the air flowing backward via the portion above the deflector to flow downward, thus airflow is prevented from reaching the rear edge portion of the opening.

In the invention where the deflector is provided with a guide face curved upward in a convex shape and wherein the airflow is led under the deflector, the airflow directed upwards along the guide face toward the back is supported by the airflow which has reached the opening via the portion under the deflector. This reduces the amount of protrusion of the guide face, thereby further reducing the wind noise.

DETAILED DESCRIPTION OF THE PREFERRED EMBODIMENTS

Figure 1:
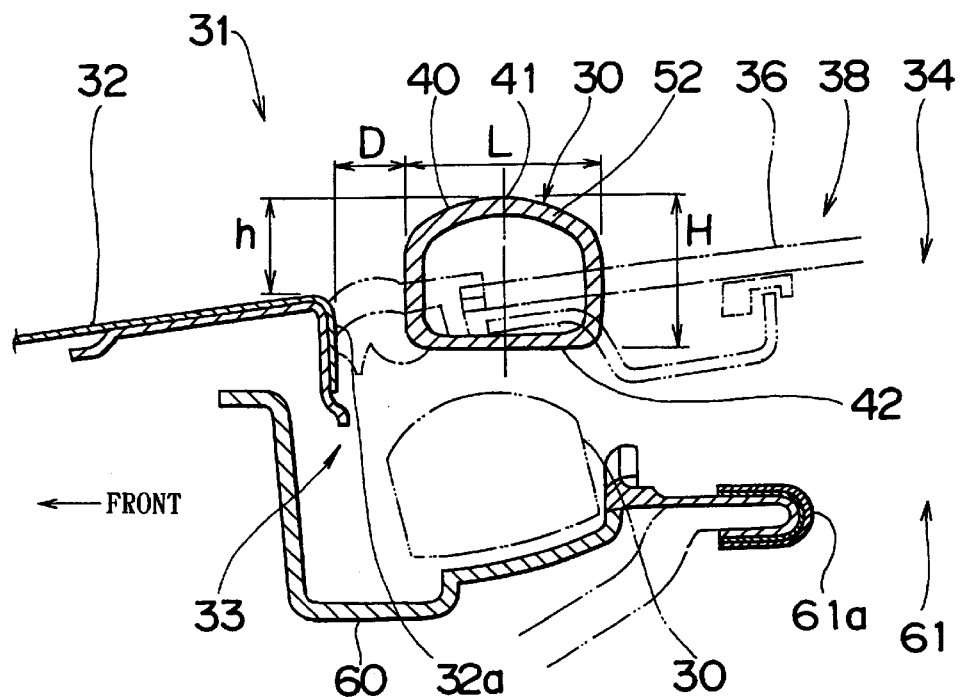
FIG. 1 is a sectional view of an embodiment of a deflector of an automobile sunroof according to the present invention.
Figure 2:
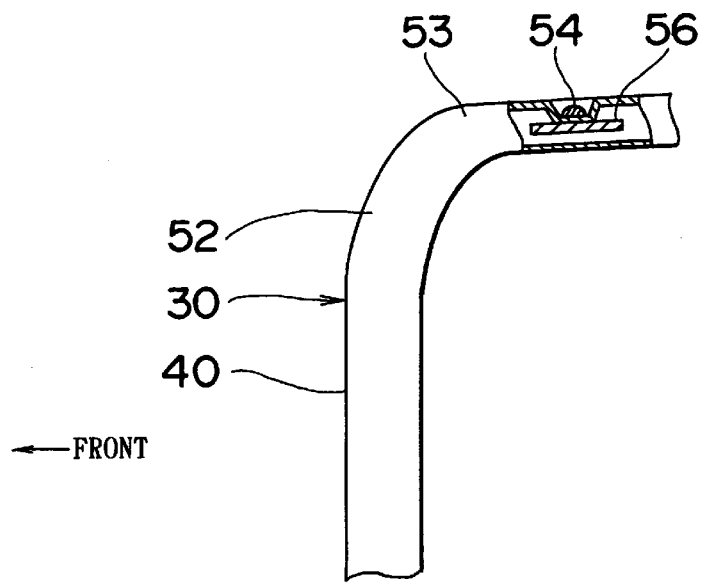
FIG. 2 is a plan view of an embodiment of the deflector of an automobile sunroof according to the present invention, showing almost half of the deflector.

Referring to FIG. 1 illustrating a sectional view, and to FIG. 2 illustrating a plan view, a deflector 30 protrudes from a roof panel 32 when the opening 34 is provided in a roof 31 of an automobile and when the opening 34 of the roof 31 made openable/closeable by a sunroof panel or a sunroof glass 36 is opened. The deflector 30 is provided with a guide face 40.

The guide face 40 of the deflector 30 is altogether smoothly curved upward in a convex shape, and has a maximum height portion 41 at almost a center thereof in the vehicle fore-aft direction.

Figure 12:
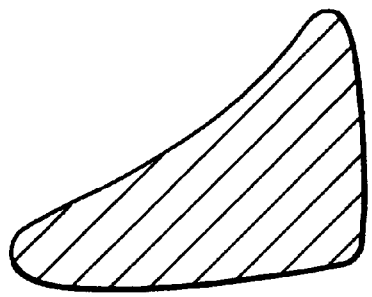
FIG. 12 is an enlarged sectional view of the deflector shown in FIG. 10 taken along line XII—XII.

In the embodiment shown by the drawings, the guide face 40 has a circular section of predetermined radius when cut at an imaginary vertical plane extending in fore-aft direction. The guide face 40 may also have an elliptical section which is along the major axis connecting the two focal points of the ellipse, to make the guide face 40 protrude smoothly upward in a convex shape. In other words, over a certain range in the fore-aft direction of the guide face 40, the airflow becomes substantially such that it closely follows the profile of the deflector, as it flows backward from a front portion along the guide face 40. The deflector of the present invention differs from that of a conventional art in that a guide face 22 of a deflector 20 shown in FIG. 12 is of a shape which separates the air at portions downstream of the point where hit by an airflow 24.

Further, in the embodiment shown by the drawings, the deflector 30 is disposed rearward at a space D from an edge portion 32a located before an opening 33 of a roof panel 32 such that airflow is capable of passing through the space D.

Figure 3A:
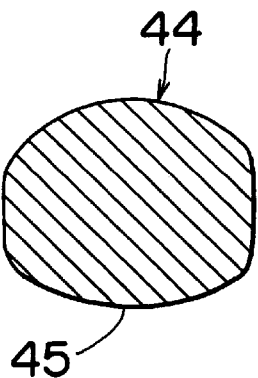
FIGS. 3A through 3C are sectional views of another embodiment of the deflector in different forms.
Figure 3B:
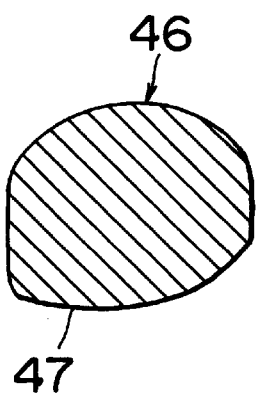
Figure 3C:
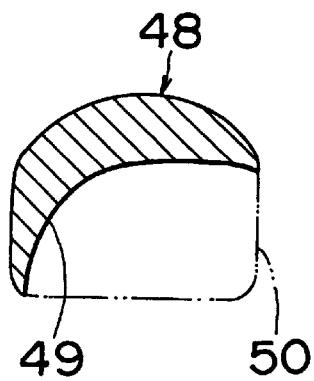

When the airflow is capable of passing through the space D, the lower side surface of the deflector may be a flat surface 42 as shown in FIG. 1, or have shapes as shown by deflectors 44, 46, and 48 as shown in FIGS. 3A through 3C. In the deflector 44, as shown in FIG. 3A, a lower side surface 45 is a circular surface in a downwardly convex shape. In the deflector 46, as shown in FIG. 3B, a lower side surface 47 has downwardly convex shaped circular surface at a front portion thereof, and a curved surface arising from this circular surface at a rear portion thereof. In the deflector 48, as shown in FIG. 3C, a lower side surface 49 has a partially concave surface. In the case of the deflector 48, the deflector 48 may be deformed by wind depending on the material. Therefore, it is desirable that a rib 50 or a plurality of ribs 50 be provided at a distance from each other in a vehicle width direction.

Figure 4:
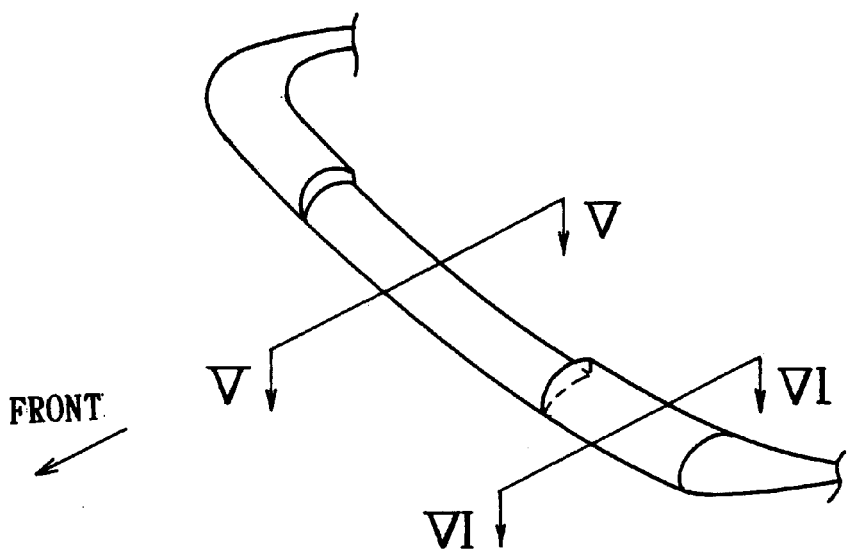
FIG. 4 is a perspective view of another embodiment of the deflector.
Figure 5:
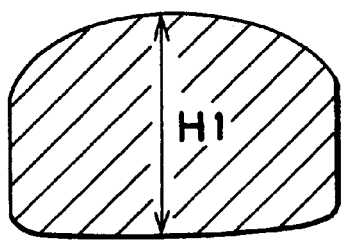
FIG. 5 is an enlarged sectional view of the deflector shown in FIG. 4 taken along line V—V.
Figure 6:
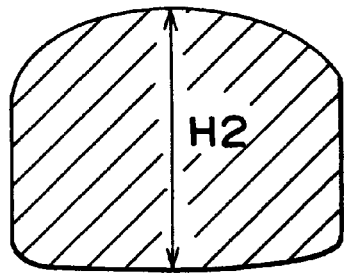
FIG. 6 is an enlarged sectional view of the deflector shown in FIG. 4 taken along line VI—VI.
Figure 7:
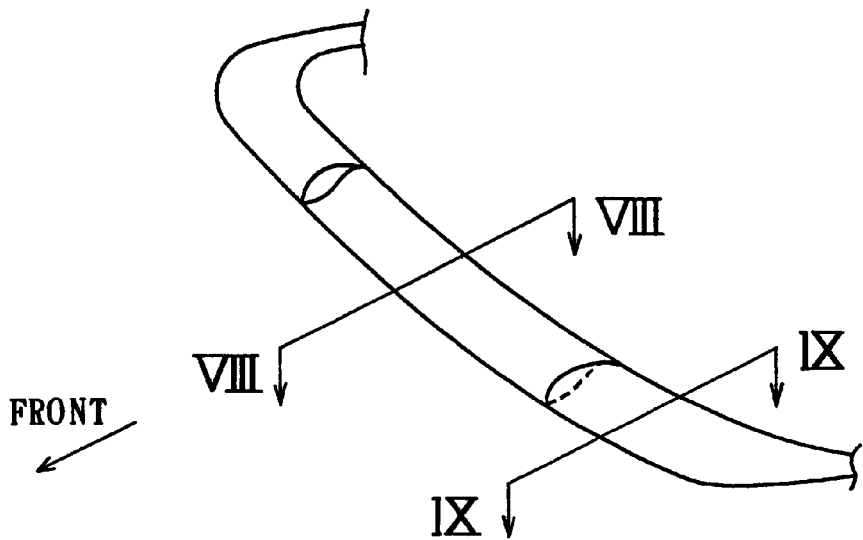
FIG. 7 is a perspective view of another embodiment of the deflector.
Figure 8:
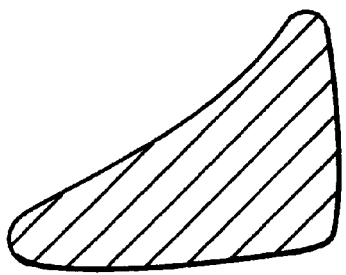
FIG. 8 is an enlarged sectional view of the deflector shown in FIG. 7 taken along line VIII—VIII.
Figure 9:
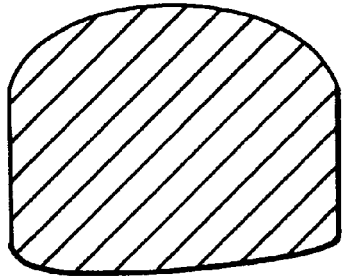
FIG. 9 is an enlarged sectional view of the deflector shown in FIG. 7 taken along line IX—IX.
Figure 10:
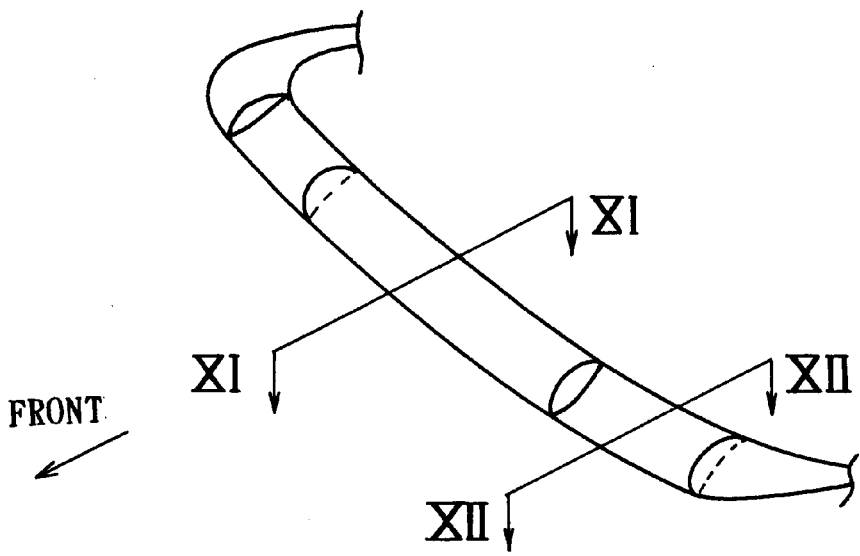
FIG. 10 is a perspective view of another embodiment of the deflector.
Figure 11:
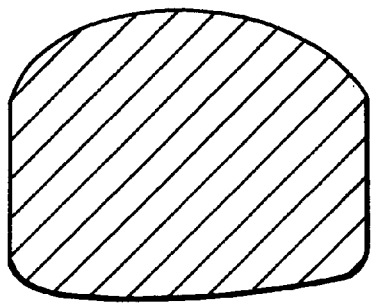
FIG. 11 is an enlarged sectional view of the deflector shown in FIG. 10 taken along line XI—XI.

The deflector 30 may be formed into a hollow shape as shown in FIG. 1 or may be formed into a solid shape as shown in FIGS. 3A–3C. Further, it is also possible to make the deflector 30 in FIG. 1 solid and the deflectors 44, 46, and 48 in FIG. 3 hollow. The deflectors 30, 44, 46, and 48 may be made by injection molding or extrusion molding hard resin, or by extrusion molding aluminum, or by welding bent iron sheets. The deflectors do not have to have the same sectional shape over the entire width in the vehicle width direction. That is, it is not necessary that the guide face 40, protruded upward altogether smoothly in a convex shape overall, be of a constant sectional shape over the entire width in the vehicle width direction. Further, the deflectors may be divided and may contain guide surfaces of different shapes at the divided portion. For example, the V—V section of the deflector shown in FIG. 4 at the center portion in vehicle width direction is as shown in FIG. 5, whereas the VI—VI section of the deflector shown in FIG. 4 at both ends in vehicle width direction is as shown in FIG. 6. A maximum height H1 of the guide surface in section V—V differs from a maximum height H2 of the guide surface in section VI—VI. In this embodiment, the high-low relationship between the maximum height H1 and the maximum height H2 may be in reverse. The VIII—VIII section of the deflector shown in FIG. 7 at the center portion in vehicle width direction is as shown in FIG. 8, whereas the IX—IX section of the deflector shown in FIG. 7 at both ends in vehicle width direction is as shown in FIG. 9. The shape of the guide surface in section VIII—VIII differs from that in section IX—IX. The XI—XI section of the deflector shown in FIG. 10 at the center portion in vehicle width direction is as shown in FIG. 11, whereas the XII—XII section of the deflector shown in FIG. 10 at both ends in vehicle width direction is as shown in FIG. 12. The shape of the guide surface in section XI—XI differs from that in section XII—XII.

The deflector 30 may be provided with a deflector portion 52 and two arm portions 53 on both sides of the deflector portion 52, as shown in FIG. 2 (only one arm portion 53 is shown in FIG. 2), so that the planar shape is in a generally U shape. Further, the deflector 30 may be formed such that the cross section of the deflector portion 52 becomes larger towards the center from the connecting portion with the arm portion 53. In this case, guide face 40 should be provided at the deflector portion 52. The deflector portion 52 and the two arms 53 may be formed integrally, or made into one piece after being separately made.

The deflector 30 is, for example, installed near the edge portion 32a of the roof panel 32 located before the opening 33 by movably installing the arm portion 53 with a bolt 54 or the like to an installation plate 56 fixed to the vehicle body panel, pulling the arm portion 53 located behind the bolt 54 by an extension spring (not shown), deflecting the deflector portion 52 at the protrusion position shown by a solid line in FIG. 1.

Figure 13:
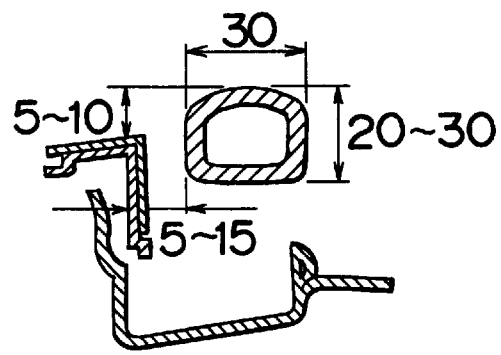
FIG. 13 is a sectional view showing the dimensions of the deflector and the dimensions with which a desirable distance was obtained between the deflector and the front edge portion of the opening.

At the protrusion position shown in FIG. 1, the deflector 30 protrudes from the roof panel 32 by a predetermined protrusion amount h, and is located at space D from the front edge portion 32a. The appropriate values for the protrusion amount h, space D, height H of the deflector portion 52 at the maximum cross section portion, and length L in fore-aft direction, that is, the dimensions (mm) which have been confirmed effective on actual vehicle are as shown in FIG. 13.

Under the opening 33 of the roof panel 32 is disposed a sunroof housing 60, which itself is known, as shown in FIG. 1, and the sunroof panel or the sunroof glass 36 is supported openable/closeable by the sunroof housing 60. An edge portion 60a of a sunroof housing 60 located before an opening 61 is located toward the rear side of the vehicle as compared to the edge portion 32a of the roof panel 32. This structure itself is publicly known. When the sunroof 38 is transparent, the sunroof is referred to as a moon roof. The sunroof panel or sunroof glass 36 is of a slidable type which is slidable in fore-aft direction or a removable type. When the sunroof panel or sunroof glass 36 is positioned at a predetermined position as shown by the imaginary line in FIG. 1 so as to close the opening 34 (the opening 33 of the roof panel 32 and the opening 61 of the sunroof housing 60) of the roof 31, the deflector 30 is pushed down to near the sunroof housing 60 below. However, when the opening 34 is opened, the deflector 30 protrudes above the roof panel 32 to the position shown by the solid line.

Figure 14:
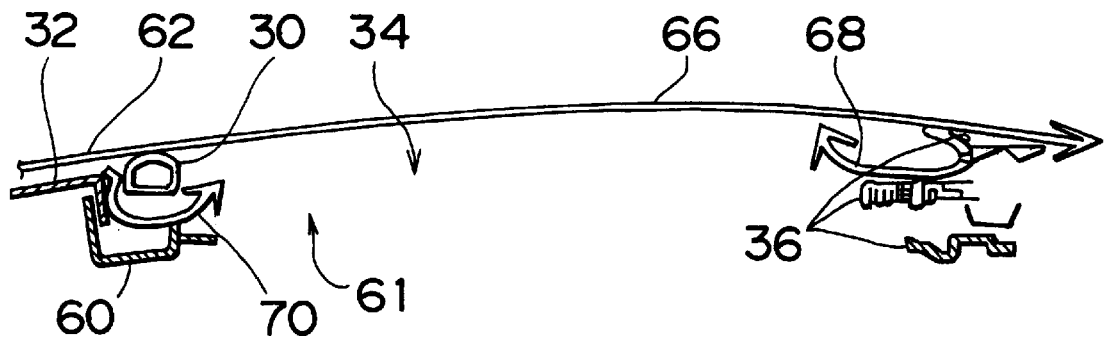
FIG. 14 is a diagram illustrating the operation of the deflector according to the present invention.
Figure 15:
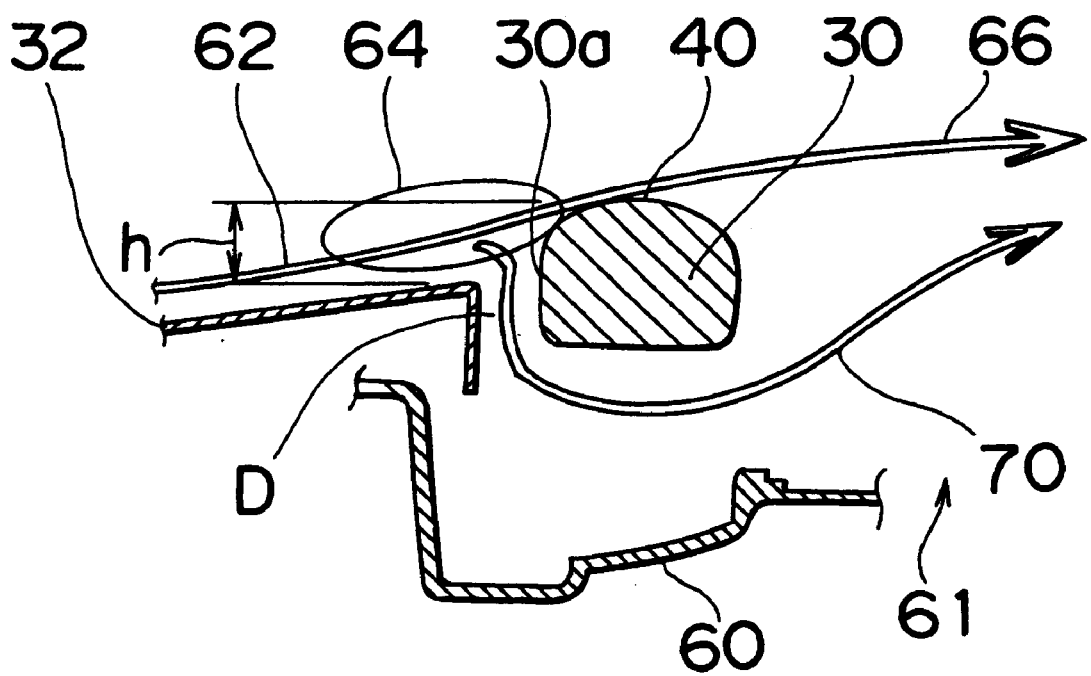
FIG. 15 is an enlarged view of a portion of FIG. 14 illustrating the operation of the deflector according to the present invention.

When a vehicle is run in a state where the deflector 30 is protruding upward from the roof panel 32, as shown in FIGS. 14 and 15, the airflow 62 which flows along the roof panel 32 hits the deflector 30 and changes direction. In this case, the protrusion amount h of the deflector 30 from the roof 32 should be predetermined such that the curvature for changing the direction of the airflow in a transition range 64 becomes small. Accordingly, the airflow 66 toward the rear side of the deflector 30 flows along the guide face 40 over a certain range, and then leaves the guide face 40. The deflector 30 only needs to deflect the airflow 66 upward to such a degree that the airflow 66 does not hit the edge portion 36 of the roof 31 located at the back of the opening 34. As a result, an airflow 68 can be prevented from being generated when the airflow 66 hits the edge portion 36 (end portion of the roof panel 32 at the back of the opening 33 and end portion of the sunroof housing 60 at the back of the opening 61). As shown in FIG. 9, the airflow which has reached the transition range 64 becomes an airflow 70 via a space D, reaches a portion under the airflow 66 which has passed the guide face 40 at the rear side of the deflector 30. Accordingly, the pressure of the airflow 70 becomes such that it supports the airflow 66 from underneath.

To serve the functions shown in FIGS. 14 and 15, it is preferable that the deflector 30 be formed as follows.

The guide face 40 of the deflector 30 has a maximum height portion 41 at almost a center thereof in the vehicle in fore-aft direction, so as to restrict the separation of flow at the guide face 40 of the deflector 30 as much as possible. Accordingly, the guide face 40 is formed small enough such that the curvature of shape change from the front end to the rear end is capable of restricting the separation of flow.

Figure 16:
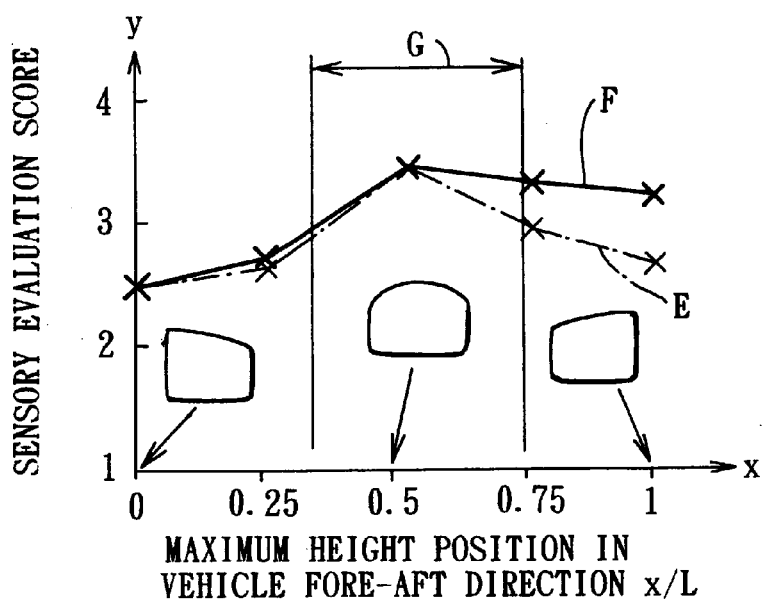
FIG. 16 is a graph illustrating the effect of the maximum height of the guide face of the deflector.

Results shown in FIG. 16 were obtained by an experiment conducted to confirm the effect of the maximum height portion 41 of the guide face 40. Here, the x-axis is a proportion of the distance x from the front end of the deflector to the maximum height portion and length L in fore-aft direction of the deflector. The deflector shape at a typical proportional value is shown in FIG. 16. Further, the axis of ordinates indicate the average value of the sensory evaluation scores of three skilled subjects. As it is apparent from FIG. 16, the wind noise E and the wind throb F were worst when the maximum height portion 41 was located on the front side. It was second worst when the maximum height portion was at the rear side, and it was best when the maximum height portion was at the center. It is safe to assume that good results can be obtained in range G where the sensor evaluation score is 3 or better. Therefore, having the maximum height portion at approximately a center of the guide face 40 means that the maximum height is in range G.

The protrusion amount h of the deflector 30 from the roof panel 32 is determined in correlation to the shape of the guide face 40 of the deflector 30. In this case, the protrusion amount h can be obtained experimentally, such that all three conditions, the curvature of flow in the transition range 64 is as small as possible, the airflow 66 which has passed the guide face 40 does not hit the edge portion 33 of the roof 31 located at the back of the opening 34, and the airflow 66 flows near the edge portion 33 as much as possible, are met.

Figure 17:
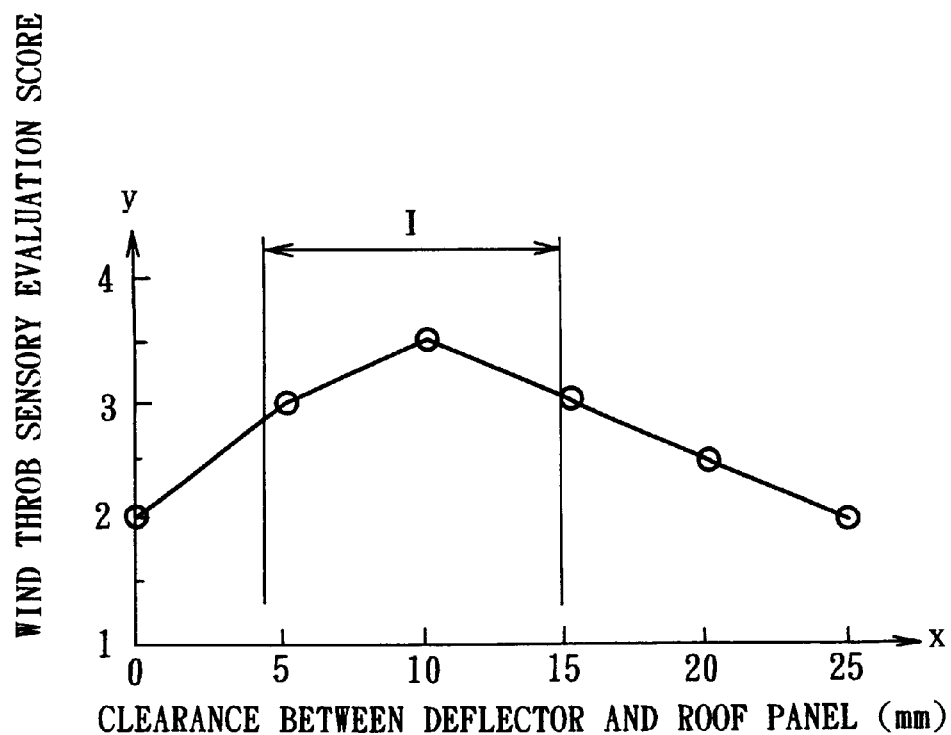
FIG. 17 is a graph illustrating the effect of the distance between the deflector and the front edge portion of the opening.

The results shown in FIG. 17 were obtained by an experiment conducted to confirm the effect of the space D between the deflector 30 and the edge portion 32a of the roof panel 32. Here, the x-axis represents the size of the space D and the y-axis represents the evaluation score of the wind throb. When the space D is 0, airflow under the deflector 30 is lost and the negative pressure at the rear portion of the deflector increases due to separation. As a result, the airflow 66 shown in FIGS. 14 and 15 falls downward to enter the negative pressure range, thereby worsening the wind throb. In the range where the space D is between 5 and 15 mm, pressure rise from below prevents the airflow 60 from falling, and restricts the wind throb. When the space D is 20 mm or more, the flow rate of the airflow 70 below increases, and the airflow 70 hits the edge portion 36 at the back of the opening 34 and becomes a factor for wind throb. Also, fluctuation in pressure is generated when airflow is disturbed by the interference of airflow 70 with the airflow 66 which has passed the guide face at rear portion of the deflector 30, thereby worsening the wind throb. Therefore, the space D required for the airflow 70 flowing under the deflector 30 to act efficiently is generally between 5 to 20 mm, and it is most desirable that the space D be in a range I wherein the sensory evaluation scores are 3 or better.

Height H of the deflector 30 can be set at approximately twice the protrusion amount h of the deflector 30 from the roof panel 32. Also, the length L in fore-aft direction of the deflector 30 can be determined in correlation to the guide face 40 shape and the protrusion amount h.

Figure 18:
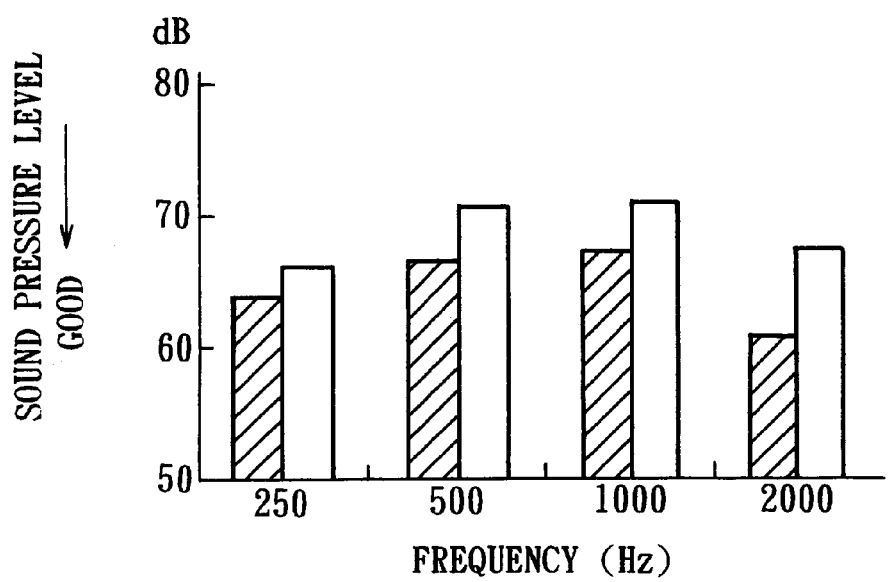
FIG. 18 is a graph illustrating the wind noise obtained by the deflector according to the present invention and a conventional deflector.
Figure 19:
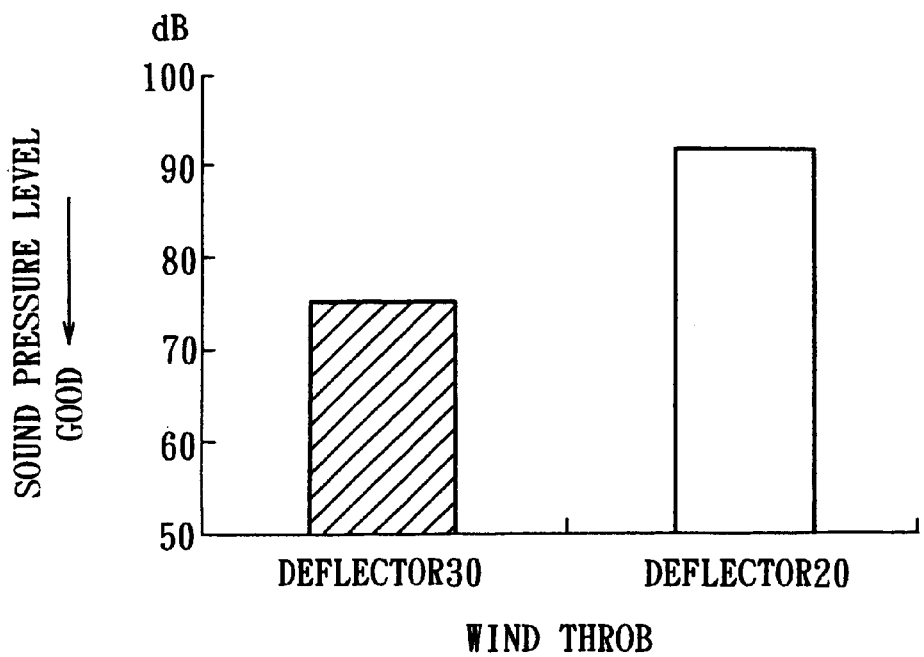
FIG. 19 is a graph illustrating the wind throb obtained by the deflector according to the present invention and a conventional deflector.
Figure 21:
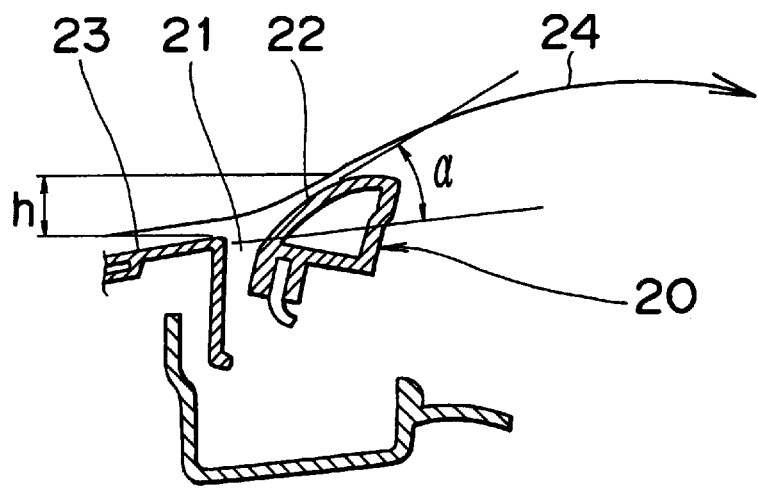
FIG. 21 is a diagram illustrating the operation of a conventional deflector.
Figure 22:
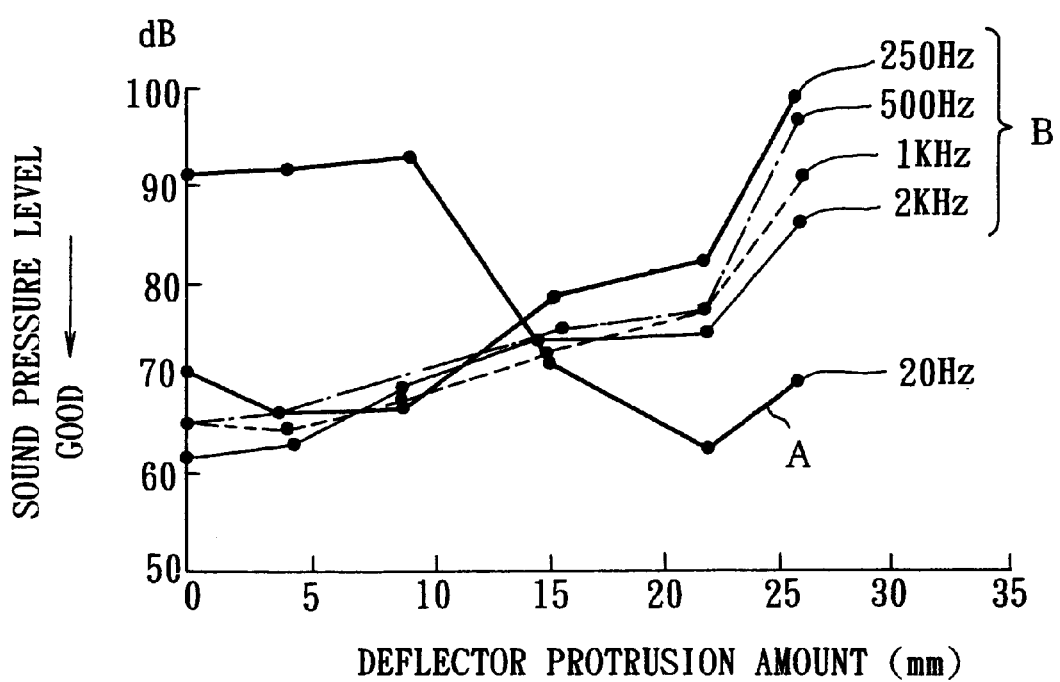
FIG. 22 is a characteristics chart showing the wind throb and wind noise of a conventional deflector.

The protrusion amount h, space D, height H, and the fore-aft length L of the deflector 30 shown in FIG. 1 were set at 10 mm, 10 mm, 20 mm, and 30 mm, respectively, and a microphone was set at ear level of a passenger at the center of front seat of an automobile to measure the wind noise and the wind throb. Comparison was made against a conventional deflector 20 shown in FIG. 21, and the protrusion amount h was 17 mm and the angle α was approximately 40°. The results are shown in FIG. 18 and 19, the wind noise indicated by characteristics A which has been corrected by human auditory sense characteristics, and wind throb without any correction. In the figure, the hatched graph is for the deflector 30 according to the present embodiment. According to the deflector 30 of the present embodiment, the wind noise, as shown in FIG. 18, is reduced in a wide frequency range, and the wind throb, as shown in FIG. 19, is significantly reduced.

Referring back to FIGS. 14 and 15, the factors such as the dimensional relationship in the transition range 64, the protrusion length h and space D of the deflector 30, for example, and the shape and angle of a front side face 30a of the deflector 30 with respect to the airflow 62 may be determined so that the airflow 70 is generated below the deflector 30 in the transition range 64. Accordingly, the airflow 62 which has reached the transition range 64 is divided into airflow 66 which flows rearward via the portion above the deflector 30, and the airflow 70 which flows rearward via the portion under the deflector 30. The airflow 70 is restricted by the sunroof housing 60, for example, so that the airflow 70 flows toward the opening 34, that is, the air substantially flows out from the opening 34 in a stream without staying in the vehicle compartment. As apparent from the foregoing, the airflow 70 maintains the pressure relationship between the airflow 66 such that the airflow 70 supports the airflow 66 from underneath. Therefore, regardless of whether the airflow 66 has been redirected by the guide face 40 of the deflector 30, the airflow 66 is prevented from hitting the edge portion 36 of the roof 31 located at the back of the opening 34 by the airflow 70.

Figure 20:
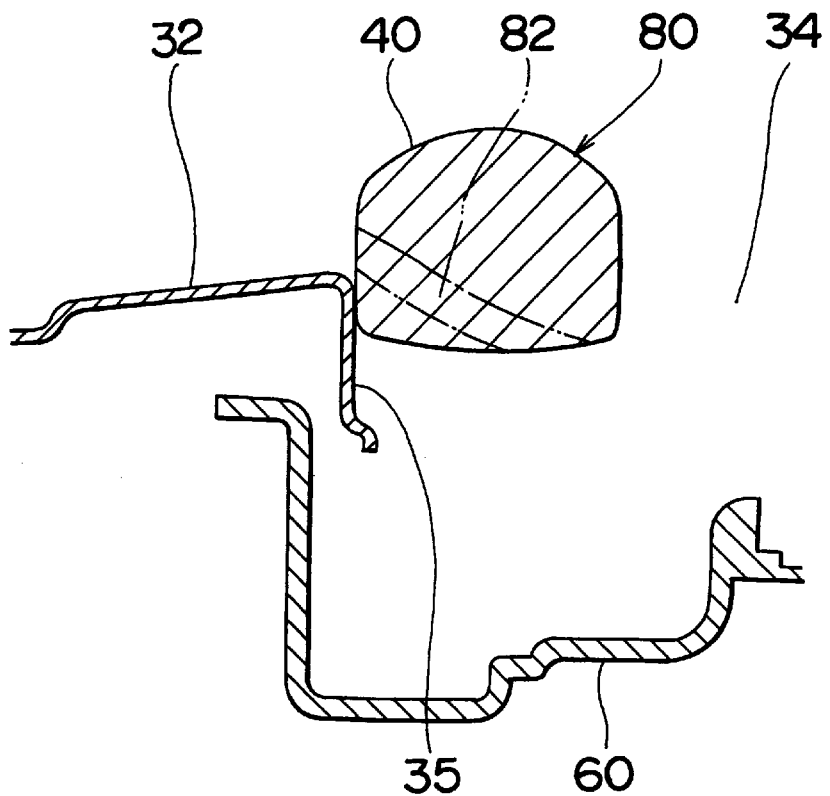
FIG. 20 is a sectional view of still another embodiment of the deflector of an automobile sunroof according to the present invention.

In the aforementioned embodiment, the deflector 30 protrudes above the roof panel 32 when the opening 34 is opened, and is accommodated in the sunroof housing 60 when the opening 34 is closed. Instead, as shown by the sectional view in FIG. 20, a deflector 80 may be fixed to the edge portion 32a of the roof panel 32 located before the opening 33 or on a top face of the roof 32 located before the edge portion 32a. The deflector 80 has the guide face 40. Further, by providing one or a plurality of passages 82 in the width direction of the deflector, or the direction orthogonal to FIG. 20, an airflow which flows toward the opening 34 via the passage 80 can be generated.

The foregoing detailed description of the preferred embodiments of this invention has been provided for the purposes of illustration and description. It is not intended to be exhaustive or to limit the invention to the precise embodiments disclosed. Other modifications and variations may be evident to practitioners in the art when considered in reference to this disclosure.

What is claimed is:

1. A deflector protruding upward from a forward edge region of an opening of a sunroof provided in a roof of an automobile, comprising:

a guide face which forms a continuous, non-interrupted surface and which smoothly curves upward in a convex shape and which has a maximum height at approximately a center thereof in a fore-aft direction of the automobile, said deflector being positioned rearwardly of the forward edge of the opening so as not to extend forwardly of the forward edge.

2. The deflector according to claim 1, wherein the automobile is provided with a sunroof panel or a sunroof glass for opening and closing the opening, and the deflector protrudes upward from the opening when the opening is opened.

3. The deflector according to claim 2, wherein the automobile is provided with a sunroof housing for openably/closeably supporting the sunroof panel or the sunroof glass, and the deflector is accommodated in the sunroof housing when the opening is closed by the sunroof panel or the sunroof glass.

4. The deflector according to claim 1, wherein the deflector is provided at the forward edge of the opening and contacts the forward edge of the opening.

5. A deflector according to claim 1, wherein said deflector is provided at a distance from the forward edge of the opening for generating a rearward airflow toward the opening while the automobile is moving forward.

6. A deflector according to claim 1, wherein the guide face is constructed and arranged such that an air passage for generating a lower rearward air flow while the automobile is moving forward is defined between the forward edge of the opening and the guide face, said lower rearward airflow being located beneath an upper rearward airflow comprising air flowing over said deflector.

7. The deflector according to claim 5, wherein the automobile is provided with a sunroof panel or a sunroof glass for opening and closing the opening, and the deflector protrudes upward from the opening when the opening is opened.

8. The deflector according to claim 7, wherein the automobile is provided with a sunroof housing for openably/closeably supporting the sunroof panel or the sunroof glass, and the deflector is accommodated in the sunroof housing when the opening is closed by the sunroof panel or the sunroof glass.

9. The deflector according to claim 1, wherein the deflector is divided into longitudinal portions, at least one portion having a different sectional shape from at least one other portion across a width of the deflector in a width direction of the automobile.

10. The deflector according to claim 6, wherein the air passage has a width measured in a fore-aft direction of the automobile which is in the range of 5 to 20 mm.

11. The deflector according to claim 10, wherein the width of the air passage is in the range of 5 to 15 mm.

12. The deflector according to claim 1, wherein the deflector protrudes upward above the forward edge of the opening of the sunroof by an amount in the range of 5 to 10 mm.

13. The deflector according to claim 1, wherein the maximum height of the guide face at approximately the center of the deflector in a fore-aft direction of the automobile is in the range of 20 to 30 mm.

14. The deflector according to claim 1, wherein the length of the guide face in a fore-aft direction of the deflector is approximately 30 mm.

* * * * *

UNITED STATES PATENT AND TRADEMARK OFFICE
CERTIFICATE OF CORRECTION

PATENT NO. : 6,213,543 B1
DATED : April 10, 2001
INVENTOR(S) : Sumitani

Page 1 of 1

It is certified that error appears in the above-identified patent and that said Letters Patent is hereby corrected as shown below:

<u>Title page,</u>
Please change "[54] DELECTOR FOR AUTOMOBILE SUNROOF" to
-- [54]  DEFLECTOR FOR AUTOMOBILE SUNROOF --

Signed and Sealed this

Twenty-second Day of January, 2002

Attest:

Attesting Officer

JAMES E. ROGAN
Director of the United States Patent and Trademark Office